Figure 1:
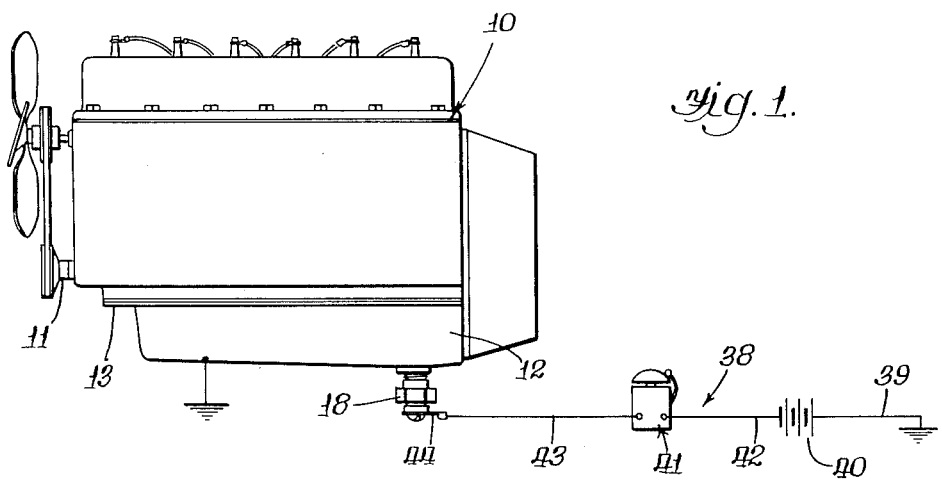

July 10, 1956  C. H. MEILE  2,754,380
CHIP DETECTING DRAIN PLUG
Filed April 7, 1953

INVENTOR.
Carl H. Meile
BY Paul O. Pippel
Atty.

United States Patent Office 2,754,380
Patented July 10, 1956

2,754,380

CHIP DETECTING DRAIN PLUG

Carl H. Meile, Fort Wayne, Ind., assignor to International Harvester Company, a corporation of New Jersey Application April 7, 1953, Serial No. 347,318

1 Claim. (Cl. 200—61.09)

This invention relates to a safety system and more particularly to a system for indicating the presence of metallic particles in the lubricating oil contained in a reservoir.

Oftentimes, metallic particles, such as minute pieces of iron and steel, become entrained in a lubricating oil reservoir of a power mechanism such as in the crankcase of an internal combustion engine or in the housing of a power transmission unit. This is especially true when the power mechanism is just newly manufactured since machining chips, nuts, bolts, etc. are quite often inadvertently deposited in the reservoir during the manufacture of the mechanism and are not removed before the mechanism is placed in operation. It is possible that the presence of foreign metallic particles in the lubricating oil will contaminate it to the extent that continued operation of the mechanism would cause extensive damage to the mechanism since the particles act as an abrasive within the body of lubricant tending to produce a deteriorating and hazardous wear on the moving parts of the mechanism. Obviously, it would be highly desirable to be appraised of the presence of metallic particles in the body of lubricating oil as rapidly as possible so that steps could be taken to remove the particles from the oil before the mechanism is damaged. It is, therefore, one of the important objects of the present invention to provide a safety system for indicating the presence of foreign metallic matter in the body of oil contained in a power mechanism lubricant reservoir.

Inasmuch as the metallic particles entrained in the body of oil have a higher specific gravity than the oil they are generally deposited on the bottom wall of the lubricant reservoir adjacent the drain opening which is usually the lowest point of the bottom wall. Consequently, it is a further object of the present invention to provide a simple, sturdy and novel drain plug adapted to close the drain opening in an oil-containing reservoir and which is further adapted for use in an electrical, metallic particle detecting system for oil-containing reservoirs.

Another object is the provision of a safety system for indicating the presence of metallic particles in the oil contained in a reservoir which includes a drain plug having a pair of electrically spaced, coaxial electrodes located in an electrical circuit with an indicating device wherein the electrical circuit is completed to energize the indicating device when metallic particles disposed on the drain plug bridge the space between the electrodes.

Figure 2:
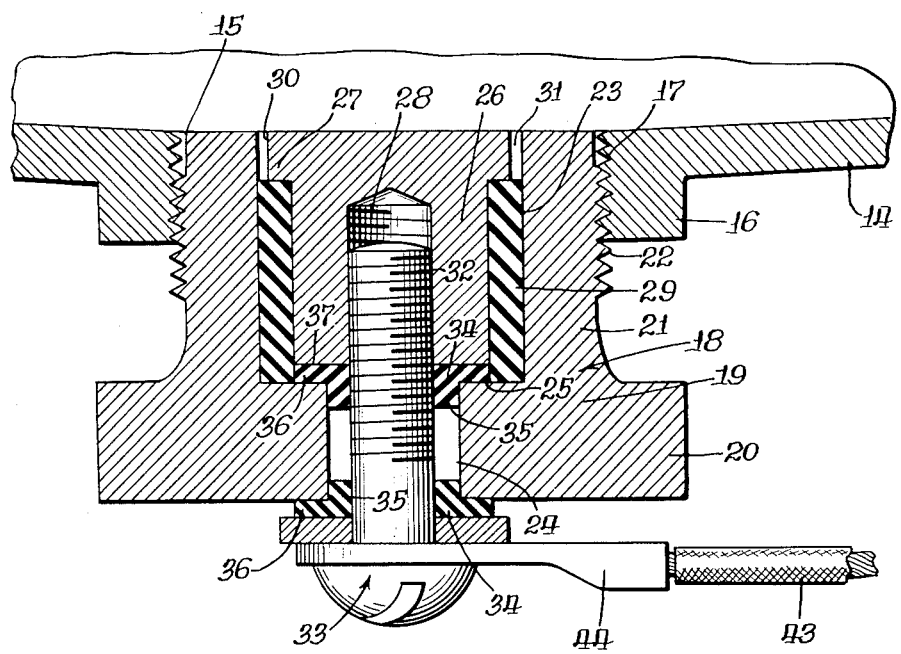

The foregoing and other important objects and desirable features inherent in and encompassed by the invention, together with many of the purposes and uses thereof, will become readily apparent from a reading of the ensuing description in conjunction with the annexed drawings, in which:

Figure 1 is a schematic view of the general layout of the metallic particle indicating system as applied to the crankcase of an internal combustion engine; and Figure 2 is an enlarged cross sectional view of the drain plug forming part of the metallic particle indicating system.

Referring to the drawings, wherein like reference characters designate like elements throughout the various views, there is shown a conventional internal combustion engine 10. The engine 10 includes a longitudinally extending crankshaft 11 disposed above a crankcase oil sump or reservoir 12. The crankcase sump 12 has a peripheral attaching flange 13 and a bottom wall 14 integrally formed with the side and end walls thereof. The crankcase sump 12 is adapted to contain a body of oil which is circulated through the engine 10 for lubricating the various moving parts thereof such as the crankshaft bearings, valve tappets, etc. and which is returned to the crankcase sump 12 in the usual manner.

Periodically the body of oil contained in the crankcase sump 12 must be replaced since it may become contaminated and unusable and for this reason a drain opening 15 is generally provided in the vicinity of the lowest point of the bottom wall 14 whereby the oil can readily flow by gravity to the exterior of the crankcase sump. The opening 15, which is defined by an annular boss 16, is provided with internal threads 17 for receiving a suitable closure member (not shown). The internal combustion engine structure described above is conventional and while the novel metallic particle detecting system structure to be described presently is incorporated in the engine structure, it is to be understood that the system can be used in conjunction with the lubricating oil reservoir of any power mechanism such as a change speed transmission.

Applicant proposes to substitute a drain plug 18, as best shown in Figure 2, for the usual drain hole closure member. The drain plug 18 includes a body 19 having a head portion 20 and a cylindrical shank 21 provided with external threads 22 for cooperation with the threads 17 formed in the crankcase sump 12. The body 19 has a central bore 23 extending inwardly from one end thereof of the length of the shank 21. Another bore 24, extending inwardly from the opposite end of the body 19, is coaxially disposed with respect to and is of smaller diameter than the bore 23 to form an annular shoulder 25. The drain plug body 19 serves as an electrode of the electrical metallic particle detecting system to be described hereinafter as well as a part of the novel drain plug for closing the drain opening 15.

Disposed within the large bore 23 is a cylindrically-shaped inner member 26 which has its uppermost end, as viewed in Figure 2, defined by a radially extending flange 27 in longitudinal alignment with the shoulder 25. A threaded recess 28 extends inwardly from the end of the inner member 26 opposite the flange 27. A sleeve-like member 29 made of neoprene or material having electrical insulating characteristics frictionally engages the bore 23 and the outer surface of the inner member 26 and extends longitudinally between the shoulder 25 and the flange 27. From the foregoing, it will be apparent that the peripheral surface 30 of the flange 27 is radially spaced from the bore 23 to provide an annular gap 31 at the upper end of the drain plug 18, as viewed in Figure 2.

The threaded recess 28, referred to above, is adapted to receive the threaded shank portion 32 of a terminal post 33. Encircling the terminal post 33 are a pair of extruded fiber washers 34, each of which includes a section 35 interposed between the shank portion 32 of the terminal post and the small bore 24 and an annular flange 36. The annular flange 36 of the uppermost washer 34, as viewed in Figure 2, abuts the shoulder 25 and the lower end surface 37 of the inner member 26. In a similar manner, the flange 36 of the lowermost washer 34 is confined between the head portion 20 and a suitable washer carried by the terminal post 33. By virtue of the above described structure it will be apparent that the inner member 26, which is to function as an electrode in the electrical circuit to be described, is effectively electrically insulated from the outer body 19 by means of the sleeve-like member 29 and the fiber washers 34. Furthermore, the member 29 and the washers 34 serve as a sealing means for preventing leakage of oil from the oil sump 12.

The electrical circuit, designated generally by numeral 38, includes a cable or wire 39 having one end connected to one terminal of an electrical power source 40, such as a storage battery, and has its other end grounded. A bell 41 is shown connected in series with the other terminal of the battery 40 by means of a cable 42. The bell 41 is of a conventional type and is responsive to electric current flow therethrough. Thus, it is to be understood that other electric current or voltage responsive alarm devices, such as lamps, horns, relays, etc., could be used in lieu of the bell 41 without departing from the spirit and scope of the invention. The bell 41 is electrically connected to the terminal post 33 by a cable 43 provided with an end connector element 44 adapted to be clamped and secured between the head portion 32 of the terminal post 33 and the washer carried by the shank portion 32. As shown schematically in Figure 1, the crankcase sump 12 is grounded.

In operation, assuming the crankcase sump 12 to be filled with oil free of metallic particles, the electrical circuit 38 is not completed because of the gap 31 separating the inner and outer electrodes 26 and 19, respectively. However, if the oil should contain metallic particles, the particles will generally settle on the bottom wall 14 of the crankcase sump 12 adjacent the drain opening 15. If the latter oil condition should exist the metallic particles deposited in the area of the drain plug 18 bridge the gap 31 and, hence, the electrical circuit 38 is completed to energize the bell 41. It is to be understood that the uppermost end surface of the member 26 could be crowned to form a sediment pocket or annulus to promote collecting particles in the gap 31 to touch off the alarm system.

The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claim.

What is claimed is:

A drain plug for use in an electrical, metallic particle detecting system for internal combustion engines having a lubricating oil-containing crankcase provided with a threaded drain opening, comprising an outer electrode threaded into the drain opening, said electrode having a first axial bore formed therein extending outwardly from one end of the electrode and a second bore of smaller diameter and in axial alignment with said first bore to form an annular shoulder; a cylindrical inner electrode disposed within and coaxial with said first bore, one end of said inner electrode being provided with a radially extending annular flange having a diameter less than the diameter of said first bore to form an annular gap, said inner electrode further having a central threaded recess extending axially from the end of said inner electrode opposite said flange; a terminal extending through said second bore adapted to be threaded into said recess and secure said inner electrode to said outer electrode, said terminal having a head portion; a sleeve-like insulating and sealing member disposed between and abutting said inner and outer electrodes and extending from said annular shoulder to said annular flange; and a pair of spaced insulating and sealing rings encircling said terminal and disposed at each end of said second bore, said rings having sections thereof interposed between and abutting said terminal and said second bore, each of said rings further having an annular flange, the flange of one of said rings being confined between one end of said inner electrode and said annular shoulder and the flange of the other of said rings being confined between the outer surface of said outer electrode and said terminal head portion.

References Cited in the file of this patent

UNITED STATES PATENTS

| | | |
|---|---|---|
| 2,252,222 | Van Os | Aug. 12, 1941 |
| 2,429,920 | Bourne, Jr. | Oct. 28, 1947 |
| 2,450,630 | Bourne, Jr. | Oct. 5, 1948 |
| 2,556,390 | Harrison | June 12, 1951 |